(12) United States Patent
Bancel et al.

(10) Patent No.: US 7,768,318 B2
(45) Date of Patent: Aug. 3, 2010

(54) DETECTION OF A DISTURBANCE IN THE STATE OF AN ELECTRONIC CIRCUIT FLIP-FLOP

(75) Inventors: Frédéric Bancel, Lamanou (FR); David Hely, Gardanne (FR); Nicolas Berard, Trets (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 214 days.

(21) Appl. No.: 12/121,957

(22) Filed: May 16, 2008

(65) Prior Publication Data
US 2009/0315603 A1    Dec. 24, 2009

(30) Foreign Application Priority Data
May 18, 2007    (FR) .................................. 07 55126

(51) Int. Cl.
*H03K 5/13*    (2006.01)
(52) U.S. Cl. ...................................... 327/20
(58) Field of Classification Search ............. 327/18–20; 714/48
See application file for complete search history.

(56) References Cited
U.S. PATENT DOCUMENTS
5,838,172 A * 11/1998 Ito .............................. 327/20

6,545,508 B2 *    4/2003    Senba ........................... 327/20
7,358,776 B2 *    4/2008    Matsumoto ................... 327/18

FOREIGN PATENT DOCUMENTS
EP    1 571 522 A1    9/2005

OTHER PUBLICATIONS

French Search Report from corresponding French National Application No. 07/55126, filed May 18, 2007, Search Report dated Nov. 26, 2007.
Hagai Bar-el et al: "The Sorcerer's Apprentice Guide to Fault Attacks" Internet Citation, [Online] May 7, 2004, XP002329915; Extrait de l'Internet: URL:http://web..archive.org/web/20041016071 838/epr-int.iacr.org/2004/100> [extrait le May 27, 2005] p. 9, section "Simple Duplication with Complementary Redundancy", p. 9, figure 14.

* cited by examiner

*Primary Examiner*—Hai L Nguyen
(74) *Attorney, Agent, or Firm*—Lisa K. Jorgenson; James H. Morris; Wolf, Greenfield & Sacks, P.C.

(57) ABSTRACT

A method and a circuit for detecting a disturbance of a state of at least one first flip-flop from a group of several first flip-flops of an electronic circuit, wherein: the respective outputs of the first flip-flops in the group are, independently from their functional purpose, combined to provide a signal and its inverse, triggering two second flip-flops having data inputs forced to a same state, the respective outputs of the second flip-flops being combined to provide the result of the detection; and a pulse signal comprising a pulse at least for each triggering edge of one of the first flip-flops in the group initializes the second flip-flops.

16 Claims, 4 Drawing Sheets

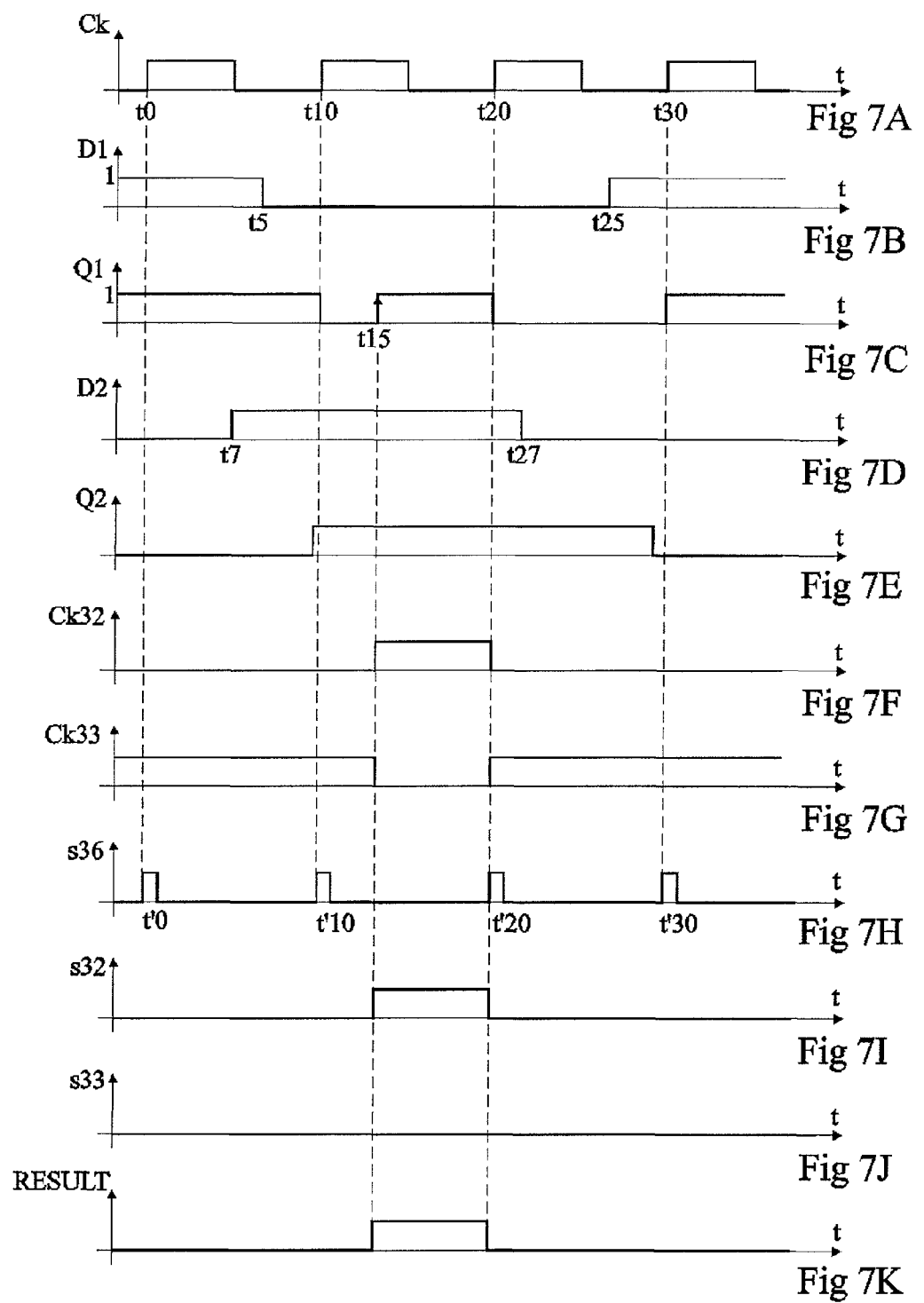

DETECTION OF A DISTURBANCE IN THE STATE OF AN ELECTRONIC CIRCUIT FLIP-FLOP

BACKGROUND OF THE INVENTION

1. Field of the Invention

The present invention generally relates to electronic circuits and, more specifically, to at least partially digital electronic circuits responsive to flip-flop states.

The present invention more specifically applies to the detection of a modification in the state of a flip-flop between two updating times.

2. Discussion of the Related Art

Logic states processed by a digital circuit may undergo incidental or forced disturbances. A forced disturbance comprises, for example, locally disturbing the circuit operation (for example, by means of a laser) to force one or several logic elements (typically flip-flops) to switch state. Such disturbances are generally called "fault injections". The results of fault injection attacks are exploited by analysis mechanisms, for example of the type known as DFA (Differential Fault Analysis).

Disturbing the state provided by a logic element of a flip-flop type may generate a more general circuit malfunction. For example, this may disturb the operation of a cryptography algorithm to discover manipulated secret quantities. According to another example, this may enable the circuit to set to a state which is in principle unauthorized (for example, to the test mode).

Flip-flop malfunctions may be of dynamic or static nature. Dynamic malfunctions result from shifts in the clock signal (glitches) or from modifications in the clock tree. Static malfunctions, to which the present invention applies, are, for example, generated by laser-type attacks to cause an output state switching of one or several flip-flops without requiring a trigger signal edge to take this state switching into account.

It would be desirable to be able to detect a possible abnormal state switching of one or several flip-flops in an integrated circuit, be this state switching incidental or forced.

SUMMARY OF THE INVENTION

To achieve all or part of these objects, as well as others, one embodiment of the present invention provides a method for detecting a disturbance of a state of at least one first flip-flop from a group of several first flip-flops of an electronic circuit, wherein:

the respective outputs of the first flip-flops in the group are, independently from their functional purpose, combined to provide a signal and its inverse, triggering two second flip-flops having data inputs forced to a same state, the respective outputs of the second flip-flops being combined to provide the result of the detection; and a pulse signal comprising a pulse at least for each triggering edge of one of the first flip-flops in the group initializes the second flip-flops.

According to an embodiment of the present invention, the combination of the outputs of the first flip-flops is of XOR type.

According to an embodiment of the present invention, the initialization signal of the second flip-flops is a periodic pulse train.

According to an embodiment of the present invention, the initialization signal is of the same period as a trigger signal common to the first flip-flops.

According to an embodiment of the present invention, the duration of the pulses of the initialization signal of the second flip-flops is at least equal to the settling time of the first flip-flops plus the combination time of their output signals.

The present invention also provides a circuit for detecting a disturbance of the state of at least one first flip-flop from a group of first flip-flops, comprising:

a first element of logic combination of the respective outputs of the flip-flops in the group, independently from the function given to the flip-flops;

second flip-flops for exploiting the result of the logic combination receiving, on their respective trigger inputs, a signal resulting from the logic combination and its inverse and, on their respective data inputs, a same state; and a second element of logic combination of the respective outputs of the two second flip-flops.

According to an embodiment, the first combination element performs an XOR-type combination.

According to an embodiment, the second combination element performs an OR-type combination.

According to an embodiment, the initialization signal is a periodic pulse train of same period as the trigger signal of the first flip-flops.

The present invention also provides an electronic circuit comprising a detection circuit.

The foregoing and other objects, features, and advantages of the present invention will be discussed in detail in the following non-limiting description of specific embodiments in connection with the accompanying drawings.

BRIEF DESCRIPTION OF THE DRAWINGS

FIGS. 7A, 7B, 7C, 7D, 7E, 7F, 7G, 7H, 7I, 7J, and 7K are timing diagrams illustrating the operation of the detector in FIG. 6.

DETAILED DESCRIPTION

Figure 1:
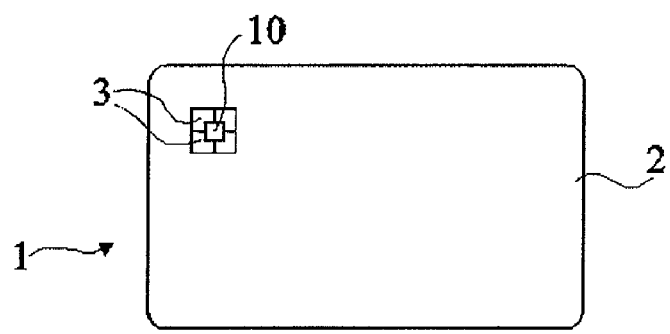
FIG. 1 shows a smart card of the type to which the present invention applies as an example.

The same elements have been designated with the same reference numerals in the different drawings, where the timing diagrams have been drawn out of scale.

For clarity, only those elements which are useful to the understanding of the present invention have been shown and will be described. In particular, the functions performed by the flip-flops having their state monitored have not been illustrated, the present invention being compatible with any usual exploitation of results provided by flip-flops. Similarly, what exploitation is made of the detection signal has not been detailed, the present invention being here again compatible with any counter-measure or exploitation of a signal for detecting a malfunction of the integrated circuit, especially due to a fault injection attack.

FIG. 1 very schematically shows a smart card 1 of the type to which the present invention applies as an example. Such a card is, for example, formed of a support 2 of plastic matter in or on which is placed an electronic circuit chip 10 capable of communicating with the outside by means of contacts 3 or by means of contactless transceiver elements (not shown). Circuit 10 of the card contains a processing unit having at least one logic function exploiting states provided by several flip-flops.

According to another example, the present invention applies to controlled-access broadcasting systems. In such an example, an antenna receives signals originating from a satellite that it transmits to a decoder for display on a television set. The decoder comprises one or several electronic boards provided with one or several circuits for digitally processing received data. This processing comprises a decoding (deciphering) by means of one or several keys owned by the decoder. The keys are contained in memories associated with the electronic circuit or on an external element, for example, a smart card introduced into the decoder. The digital processings performed based on the keys exploit temporary storage registers formed of flip-flops.

According to the circuits and applications, a flip-flop assembly may, for example, form a counter. According to another example, a flip-flop contains a bit conditioning the access to a circuit function. According to still another example, several flip-flops form a register for temporarily storing a variable, for example used by an algorithm and involving a ciphering or deciphering key.

Figure 2:
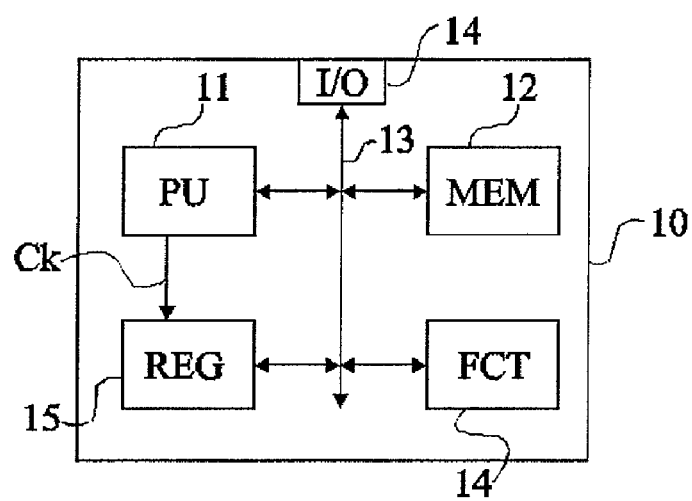
FIG. 2 is a block diagram of an embodiment of an electronic circuit.

FIG. 2 is a block diagram of an embodiment of an electronic circuit 10. This circuit comprises a processing unit 11 (PU) capable, for example, of executing programs contained in one or several memories 12 (MEM), for example, a non-reprogrammable non-volatile memory, and a RAM. One or several data, control, and address buses 13 are used as a support for the communication between the different components of circuit 10 and with an input/output interface 14 (I/O) of communication with or without contact with the outside. Most often, circuit 10 comprises other functions (block 14, FCT) depending on the application. These are, for example, dedicated cryptographic calculation cells for implementing ciphering and deciphering algorithms. Such algorithms exploit temporary storage elements 15 (for example, registers REG) assigned to unit 11 and/or to cell 14. These registers are formed by means of one or several flip-flops according to the number of stored bits. One or several signals (for example, a clock signal Ck) for triggering or synchronizing state switchings of the registers are provided, for example, by processing unit 11.

Figure 3:
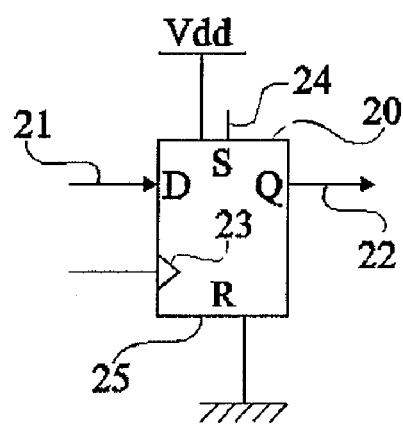
FIG. 3 is a simplified diagram of a flip-flop.

FIG. 3 shows the diagram of a flip-flop 20 forming a bit of a register. This flip-flop transfers a value (0 or 1) present on a D input terminal 21 towards a direct Q output terminal 22 (or the inverse of the data towards an inverse output terminal, not shown). The transfer is performed for each edge (for example, rising) of a signal applied on a trigger terminal 23. The flip-flop is supplied by a D.C. voltage Vdd having its potentials conditioning the levels of states 0 and 1. The flip-flop is capable of being initialized (forced) to state 1 or to state 0 by application of a signal on a set (SET) terminal 24 (S) or on a reset (RESET) terminal 25 (R).

For a register over several bits, several flip-flops 20 are used in parallel.

According to another example applied to a counter, several flip-flops having their respective outputs Q providing the different counter bits are assembled in cascade. For a synchronous counter, the output states of previous ranks are provided to the D input of the flip-flops of next ranks, possibly by being combined by an AND gate with the result of the flip-flop of still previous rank, and all flip-flops are triggered by a same signal. For an asynchronous counter, only the first flip-flop receives a trigger signal, each other flip-flop being triggered by the output of the flip-flop of previous rank and all inputs 21 of the flip-flops receiving a high level.

Figure 4A:
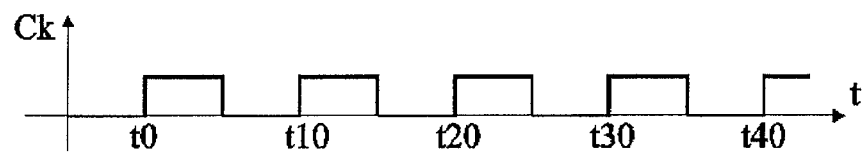
FIGS. 4A, 4B, and 4C are timing diagrams illustrating an example of disturbance of the operation of the flip-flop of FIG. 3.
Figure 4B:
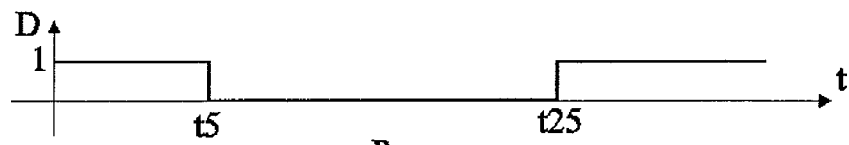
Figure 4C:
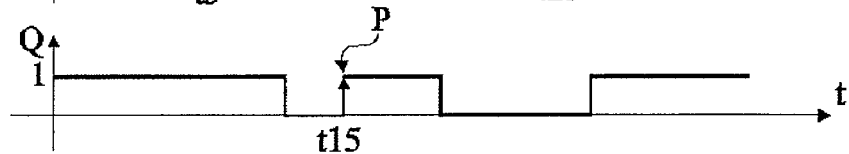

FIGS. 4A, 4B, and 4C illustrate the operation of a flip-flop 20 in a state switching. FIG. 4A shows an example of the shape of a clock signal Ck used as a trigger signal. FIG. 4B shows an example of the shape of a signal present at the D input of the flip-flop. FIG. 4C shows the corresponding shape of the signal provided at the Q output of this flip-flop. It is assumed that the taking into account of the input state is performed for each rising edge to, t10, t20, t30, and t40 of signal Ck, but a triggering on a falling edge is also possible. In FIG. 4B, a signal D initially at the high state (1), which falls back to state 0 at a time t5 and rises back to state 1 at a time t25 is assumed. Signal Q (FIG. 4C) initially at state 1 switches to state 0 at time t10 which follows the falling edge of signal D. The rise of signal D at time t25 between times t20 and t30 is followed, at time t30, by a switching of the state of the Q output to state 1. If a disturbance p occurs at a time t15 intermediary between times t10 and t20 and causes a setting to state 1 of signal Q, state 1 remains until the next rising edge (time t20) of signal Ck where the level of the D data input is taken into account again.

It can thus be seen that between two edges of same direction of the trigger signal, between which the state of the Q output of the flip-flop is supposed to remain steady (between two times when the level on the D input is taken into account), there is a risk of incidental or forced malfunction. Indeed, a state switching on the Q output of the flip-flop risks then being erroneously interpreted by the logic circuits exploiting this bit.

Among the counter-measures applicable to static-type malfunctions, parity calculations on the input of these registers, stored in another register, are sometimes used. The content of this other register is compared with the parity calculation performed on the output of the registers. A disadvantage is the cost in surface area (on the order of 20% of the surface area of the flip-flops taken into account).

Figure 5:
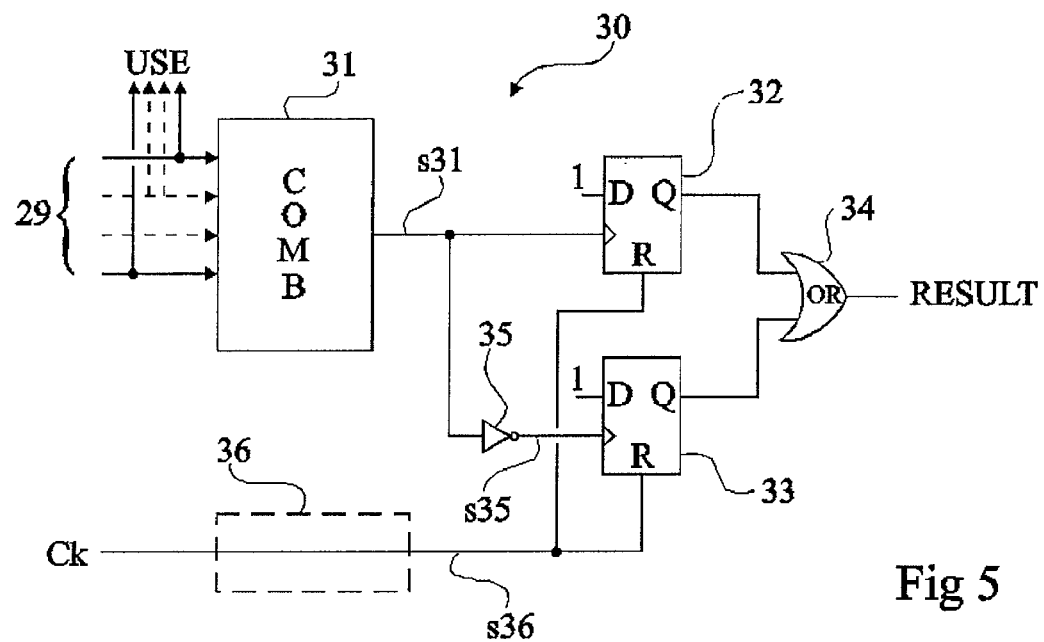
FIG. 5 is a functional block diagram of an embodiment.

FIG. 5 is a block diagram of an embodiment of a circuit 30 detecting a state switching of a flip-flop during the period when its output is supposed to remain steady, that is, between two successive edges of the signal triggering the state switchings.

The embodiment shown in FIG. 5 comprises combining (block 31, COMB) the respective states of the outputs of several flip-flops of a group 29 of flip-flops, independently from the use (USE) made of these states by the rest of the electronic circuit. Accordingly, detector 30 has an operation independent from the use of the states of the bits provided by the flip-flops. In the shown example, all the flip-flops in a same group are triggered by a same periodic signal. As a variation, the signal is not periodic and/or all or part of the flip-flops in the group are triggered by different signals.

The combination performed by circuit 31 provides, in this example, a result (s31) which is sent onto the respective clock inputs of two flip-flops 32 and 33 having their respective direct Q outputs combined by an OR-type gate 34 providing the result (RESULT) of the detection. Flip-flop 32 receives direct signal s31 while flip-flop 33 receives it inverted (inverter 35). The inversion function may be obtained by directly sampling an inverse output of circuit 31. The D data inputs of the two flip-flops 32 and 33 are forced to the same state, for example, high (1).

Figure 6:
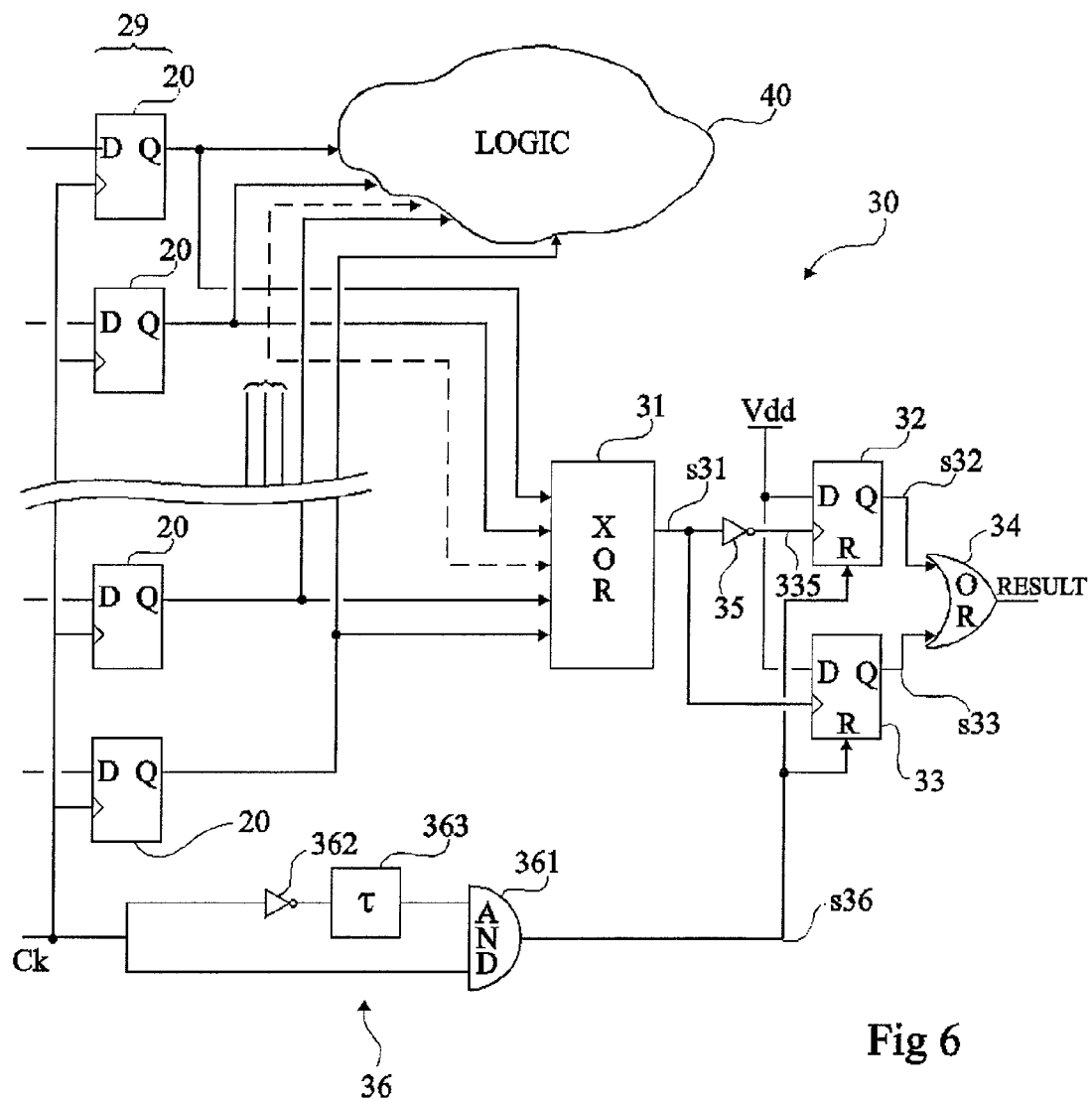
FIG. 6 is a detailed embodiment of a circuit for detecting an abnormal state switching of one or several flip-flops.

The two flip-flops 32 and 33 receive, on their respective reset inputs R, a pulse signal s36 comprising a reset activation edge at least for each edge triggering one of flip-flops 20 of group 25. Signal s36 is, preferably, generated by a circuit 36 (in dotted lines in FIG. 5 to underline its optional character)

from a common trigger signal Ck of flip-flops 20. Signal 36 comprises pulses synchronous with signal Ck, preferentially of a width smaller than the half-period of signal Ck and, preferably, as short as possible. In the example of FIG. 6, pulse train generation circuit 36 comprises two parallel paths for combining signal Ck by means of an AND gate 361, having its output s36 provided to the R inputs of flip-flops 32 and 33. An input of gate 361 receives signal Ck and the other input receives the inverse (inverter 362) of signal Ck, delayed (delay element 363) by a determined time period τ. Time period τ sets the duration of the pulses of signal s36. It is selected to be greater than the settling time of the flip-flops having their operation monitored plus the time of propagation in circuit 31.

FIG. 6 shows a more detailed example of detector 30. All the flip-flops 20 in group 29 provide their respective output states to one or several logic exploitation circuits 40, independent from detection circuit 30. These outputs are further sent onto a combination circuit 31, in this example, performing an XOR-type function on the set of states provided by flip-flops 20. Output s31 of circuit 31 is exploited similarly to that described in relation with FIG. 5 (with respect to FIG. 5, FIG. 6 illustrates a variation in which signal s31 is sent directly onto flip-flop 33 and, after inversion 35, onto flip-flop 32, which changes nothing to the operation).

FIGS. 7A, 7B, 7C, 7D, 7E, 7F, 7G, 7H, 7I, 7J, and 7K are timing diagrams illustrating the operation of detector 30 of FIG. 6. FIGS. 7A, 7B, and 7C should be compared with FIGS. 4A, 4B, and 4C by taking as an example a first flip-flop of group 29 (input D1, output Q1) having its output undergoing an abnormal state switching at time t15. A second flip-flop, having its respective input D2 and output Q2 illustrated as an example in FIGS. 7D and 7E, belongs to group 29. To simplify the description, the example is limited to two flip-flops. FIGS. 7F and 7G illustrate the respective states of trigger signals Ck32 and Ck33 of flip-flops 32 and 33 of detector 30. FIG. 7H illustrates the shape of signal s36 generated by circuit 36. FIGS. 7I and 7G illustrate the respective states of signals s32 and s33 of the direct outputs (Q) of flip-flops 32 and 33. FIG. 7K illustrates the shape of detection signal RESULT provided by gate 34.

It is assumed that input D2 of the second flip-flop to be monitored switches to state 1 at a time t7 before edge t10 of signal Ck. Accordingly, its output Q2 switches to the high state at time t10. Then, a resetting of output signal Q2 of this flip-flop is assumed at time t30 after a state switching at a time t27 of its input D2 between times t20 and t30.

Reset signal s36 of flip-flops 32 and 33 corresponds to a train of short pulses having their rising edges corresponding to those of signal Ck and their respective falling edges t', t'10, t'20, t'30, etc. slightly delayed with respect to times t0, t10, t20, and t30, etc. This signal is used to periodically inhibit the detection during time ranges where the flip-flops switch state in normal operation and while logic circuit 31 propagates the information.

In the absence of any disturbance, signals Ck32 and Ck33 are steady in the high state under the effect of the XOR-type combination 31 of outputs Q1 and Q2. No state switching occurs on outputs s32 and s33 of flip-flops 32 and 33. Accordingly, the combination by gate 34 of these results provides a permanent zero state.

In case of a disturbance (time t15, FIG. 7C), the switching of signals Ck32 and Ck33 causes, at time t15, a switching to the high state of output s32 until time t20. This results in a square pulse at state 1 of signal RESULT between times t15 and t'20.

What has been discussed as an example of two flip-flops also applies whatever the number of flip-flops monitored by combination 31. Indeed, a state switching of output s31 caused by a normal operation occurs before the falling edge (time t') of signal s36. Accordingly, the inversion of the states between signals Ck32 and Ck33 will trigger no switching of one of outputs s32 and s33 and signal RESULT will remain steady in the low state. However, any state switching between two pulses of signal s36 immediately causes (after propagation in circuit 30) a switching of signal RESULT.

An advantage of the described embodiments is that it is now possible to verify the steadiness of a signal between two switchings to detect a possible malfunction.

Another advantage is that the logic used for the detector takes up little space with respect to a parity calculation.

The number of flip-flops taken into account by a same detection circuit results from a compromise between the propagation time of the logic states in element 31 which conditions the "blind" period (the minimum duration of the pulses of signal s36) and the detection circuit bulk. A number of flip-flops 20 ranging between 8 and 32 is a good compromise.

As a specific example of embodiment, a delay τ ranging between 1.5 and 4 nanoseconds will be selected.

It is not necessary to monitor all bits of all registers in the integrated circuit. Preferably, the most critical registers are selected. For example, the registers through which cryptographic keys transit, or registers for setting a circuit operating mode, for example, a secure operating mode, are selected.

Specific embodiments of the present invention have been described. Various alterations and modifications will occur to those skilled in the art. In particular, the selection of the number of flip-flops taken into account by a same detection circuit depends on the compromise indicated in the present description and will be selected according to the needs of the application.

Further, other pulse signals s36 for resetting or setting flip-flops 32 and 33 of the detection circuit may be envisaged. For example, if all the monitored signals are signals having a state which varies little (for example, operating mode signals (test, user, etc.)) and having their switchings synchronous with a clock signal Ck, circuit 36 may be omitted. The periods when clock signal Ck is in the high state may then form the flip-flop initialization pulses. Whatever the duration of the periods in the high state, the detection circuit will provide a reliable detection result at the end of at most one half period of signal Ck, which is enough for an unfrequent state switching of the signals to be monitored.

Moreover, it is possible for signal s36 not to be periodic but to be obtained by combining (for example, by an OR-type logic) the trigger signals of flip-flops 20 of group 29 to exhibit a pulse for each rising edge of one of these flip-flops. Detection circuit 30 then exhibits a "blind" period for each normal trigger signal of one of the flip-flops of group 29.

Finally, flip-flops 32 and 33 may have their respective data inputs forced to the low state rather than to the high state. In this case, signal Ck is used, not to reset the flip-flops, but to initialize (set) them by being applied to set terminals of the flip-flops.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for detecting a disturbance of the state of at least one first flip-flop from a group of first flip-flops, comprising:
   a first element of logic combination of the respective outputs of the flip-flops in the group, independently from the function given to the flip-flops of the group;
   two second flip-flops for receiving, on their respective trigger inputs, a signal resulting from the logic combination and an inverse of the logic combination and, on their respective data inputs, a same state; and
   a second element of logic combination of the respective outputs of the two second flip-flops.

2. The circuit of claim 1, wherein the first combination element performs an XOR-type combination.

3. The circuit of claim 1, wherein the second combination element performs an OR-type combination.

4. The circuit of claim 1, wherein the initialization signal is a periodic pulse train of same period as the trigger signal of the first flip-flops.

5. An electronic circuit comprising the detection circuit of claim 1.

6. A method for detecting a disturbance of a state of at least one first flip-flop from a group of several first flip-flops of an electronic circuit, wherein:
   the respective outputs of the first flip-flops in the group are, independently from their functional purpose, combined to provide a signal and its inverse, triggering two second flip-flops having data inputs forced to a same state, the respective outputs of the second flip-flops being combined to provide the result of the detection; and
   a pulse signal comprising a pulse at least for each triggering edge of one of the first flip-flops in the group initializes the second flip-flops.

7. The method of claim 6, wherein the combination of the outputs of the first flip-flops is of XOR type.

8. The method of claim 6, wherein the initialization signal of the second flip-flops is a periodic pulse train.

9. The method of claim 8, wherein the initialization signal is of a same period as a trigger signal common to the first flip-flops.

10. The method of claim 6, wherein the duration of the pulses of the initialization signal of the second flip-flops is at least equal to the settling time of the first flip-flops plus the combination time of their output signals.

11. A method for detecting a disturbance of a state of at least one flip-flop from a first set of flip-flops of an electronic circuit, comprising:
   combining outputs from flip-flops of the first set, independently from functional purposes of first flip-flops of the first set, to provide a signal and an inverse of the signal;
   triggering a first flip-flop of a second set of flip-flops with the signal;
   triggering a second flip-flops of the second set of flip-flops with the inverse of the signal, the flip-flops of the second set having a common input state; and
   combining outputs of the second set to detect the disturbance.

12. The method of claim 11, wherein combining outputs of the first set of flip-flops includes combining outputs of the first set of flip-flops with an XOR type function.

13. The method of claim 11, further comprising:
   initializing the flip-flops of the second set with a pulse signal that includes a pulse at least for each triggering edge of a flip-flop in the first set.

14. The method of claim 13, wherein initializing the flip-flops of the second set includes initializing the flip-flops of the second set with a periodic pulse train.

15. The method of claim 14, wherein the pulse train is of a same period as a trigger signal common to the plurality of first flip-flops.

16. The method of claim 13, wherein a duration of the pulses of the initialization signal of the flip-flops of the second set is at least equal to the settling time of the flip-flops of the first set plus a combination time of their output signals.

* * * * *

UNITED STATES PATENT AND TRADEMARK OFFICE
CERTIFICATE OF CORRECTION

PATENT NO. : 7,768,318 B2                                                                                       Page 1 of 1
APPLICATION NO. : 12/121957
DATED : August 3, 2010
INVENTOR(S) : David Hély et al.

It is certified that error appears in the above-identified patent and that said Letters Patent is hereby corrected as shown below:

Col. 4, line 10 should read:
performed for each rising edge t0, t10, t20, t30, and t40 of
    line 15 should read:
state 0 at time t10 which follows the falling edge of signal D.

Signed and Sealed this

Twenty-eighth Day of September, 2010

David J. Kappos
*Director of the United States Patent and Trademark Office*